United States Patent Office
3,778,394
Patented Dec. 11, 1973

3,778,394
POLYMERIC FATTY ACID POLYAMIDE MODIFIED WITH A ROSIN ADDUCT
Roger A. Lovald, Roseville, and David W. Glaser, St. Paul, Minn., assignors to General Mills Chemicals, Inc.
No Drawing. Filed Aug. 24, 1972, Ser. No. 283,457
Int. Cl. C08g 20/00; C09d 11/08
U.S. Cl. 260—18 N                                    4 Claims

ABSTRACT OF THE DISCLOSURE

A polyamide resin-dicarboxylic acid or anhydride adduct. The dicarboxylic acid or anhydride component is selected from maleic acid, maleic anhydride and fumaric acid. The adducts have unique properties as ink varnish binders.

---

This invention relates to an amidification product. More particularly, this invention relates to an amidification product of an adduct of rosin acids and a dicarboxylic acid or anhydride, polymeric fat acid, and an alkylene polyamide.

The amidification products are useful as binders for water-based printing ink. Inks made from these amidification products display almost instant water resistance and drying speed when applied on absorbent substrates such as paper.

The amidification products of this invention are thermoplastic polyamide resins obtained from an amidification of the components recited above. A description and/or preparation of the components is discussed below. Finally the preparation of the polyamide resin itself is discussed in detail under the appropriate heading below.

POLYAMIDE COMPONENTS

Rosin acid-dicarboxylic acid or anhydride adduct

One of the constituents of the thermoplastic polyamides of this invention is an adduct of rosin acid and an aliphatic, unsaturated, dicarboxylic acid or anhydride selected from maleic anhydride, maleic acid, fumeric acid and mixtures thereof. The adduct can contain from about 100 to 200 equivalent percent of the unsaturated aliphatic dicarboxylic acid anhydride to 100 equivalent percent rosin acid. Preferably the mole ratio is about one to one.

Rosin acids are abietic, dihydroabietic and dehydrabietic acids. They are residues from the distillation of oleoresin obtained from Pinus palustris. They are commercially sold as gum rosin, wood rosin and tall oil rosin. Tall oil is a by-product of wood pulp. In the crude state it contains about 34 to 40% abietic acid, dihydroabietic and dehydrabietic acid, generally called the rosin acids, about 50 to 60% unsaturated fatty acids, generally called tall oil fatty acids, and about 5 to 10% unsaponifiable material. The unsaturated fatty acids generally contain from 16 to 24 carbon atoms and predominantly monomeric oleic and linoleic acid. The components of tall oil are commercially available as tall oil rosin acid and tall oil fatty acids. A typical commercially available rosin maleic anhydride adduct is sold under the trademark "Arochem® 404" by Ashland Chemical Co.

In general, the rosin acid-maleic anhydride, maleic acid or fumaric acid adduct is made by heating with agitation a mixture of rosin acids and the dicarboxylic acid or anhydride to a temperature of about 130° to 250° C. The heated mixture is held at that temperature for about one half hour to three hours.

Polymeric fat acid

Polymeric fat acids are commercially available products. A description of polymeric fat acids and their method of preparation may be found in U.S. Pat. 3,157,681 which disclosure is herein incorporated by reference. As set out in that disclosure, polymeric fat acids can result from the catalytic polymerization of ethylenically or acetylenically unsaturated monocarboxylic aliphatic acids containing from 8 to 22 carbon atoms. Unsaturated aliphatic monocarboxylic acids can also be polymerized in the absence of a catalyst. Unsaturated aliphatic monocarboxylic acids having 16 to 18 carbon atoms are preferred for purposes of the present invention. Most preferred are unsaturated, aliphatic monocarboxylic acids containing 18 carbon atoms. Linoleic and oleic acids are examples of useful unsaturated aliphatic monocarboxylic acids containing 18 carbon atoms.

After polymerization with or without a catalyst, the resulting mixture contains predominantly dimeric fat acids, some trimeric and higher polymeric fat acids and some unpolymerized monomeric fat acids. Typical compositions of commercially available polymer fat acids based on unsaturated $C_{18}$ fat acid are:

$C_{18}$ monocarboxylic acids 5–15% by weight;
$C_{36}$ dicarboxylic acids 60–80% by weight;
$C_{54}$ (and higher) tricarboxylic acids 10–35% by weight.

These mixtures may be fractionated by suitable means such as high vacuum distillation or solvent extraction techniques so as to obtain dimer acid cuts of higher concentration where necessary. For the purposes of making the selected thermoplastic polyamides useful in the present invention, the monomeric fat acids content can vary over a fairly wide range, preferably from about 5% to 20% by weight. Polymeric fat acids may also be hydrogenated (before or after fractionation) to reduce unsaturation. Hydrogenation is generally conducted under hydrogen pressure in the presence of a hydrogenation catalyst. It is also understood that such other derivatives of polymeric fat acids which are capable of forming amides in reaction with a diamine, such as the lower alcohol (1–8 carbon atoms) esters of polymeric fat acids may be employed in place of the acids themselves in which the by-product is then a lower alcohol rather than water.

Polyamine component

The polyamine component of the thermoplastic polyamides are alkylene polyamines having the formula:

wherein $x$ is an integer of 2 through 6 and $y$ is an integer of 0 through 4. Included among these alkylene polyamines are ethylene diamine, diethylene triamine, triethylene tetramine, tetraethylene pentamine, pentaethylene hexamine, hexamethylene diamine, 1,3-propanediamine and polyhexamethylene polyamine.

Optional co-acids

Optionally, dicarboxylic acids having the formula

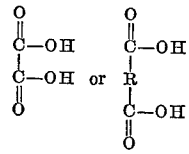

wherein R is an alkylene radical having 1 to 8 carbon atoms, can be incorporated into the polyamide to raise the melting or softening point of the resin. Useful dicarboxylic acids contain 2 to 10 carbon atoms and include malonic, succinic, glutaric, adipic, pimelic, suberic, azelaic, sebacic, phthalic, isophthalic and terephthalic acids. Generally the co-dicarboxylic acid can be used in amounts up to about 25 equivalent percent of the total acid component. Monomeric fatty acids containing 16 to 18 carbon atoms, preferably 18 carbon atoms, can also be added to raise the melting or softening point of the resin or to control molten viscosity. Linoleic acid, oleic acid, stearic acid and mixtures thereof are particularly preferred. Mixtures of linoleic and oleic acid are the major constituents of the naturally occurring tall oil fatty acids. Tall oil fatty acids can be used in formulating the polyamides of this invention. Generally, monomeric, unsaturated fatty acids can be used in amounts up to about 10 equivalent percent of the total acid component.

Preparation of polyamide

To make the selected polyamides, the adduct is prepared as described above. The temperature of the adduct upon preparation is about 130° to 250° C. as described above. Polymeric fat acids are added to the heated adduct. The resulting mixture is then cooled to a temperature of about 70° to 100° C. and the alkylene polyamine is added. An opaque, foam-containing paste results. The paste is heated to a temperature of about 120° to 140° C. and held for a period of about 15 to 45 minutes. The temperature is then raised to 225° C. and the product is held at that temperature for a period of about 15 to 45 minutes. Vacuum may be applied if desired to withdraw volatile by-products and to keep the resin mixture from contact with air which may cause darkening. An inert gas may be employed to avoid contact with air.

Typical useful amounts of reactants may be expressed as follows:

| | Equivalent percent, general range |
|---|---|
| Total acid component: | |
| (a) Adduct (rosin acid-dicarboxylic acid or anhydride) | 50-75 |
| (b) Polymeric fat acid | 17-35 |
| (c) Monomeric fatty acid | 0-10 |
| (d) Co-dicarboxylic acid | 0-25 |
| Total amine component: | |
| Alkylene polyamine | [1] 45-70 |

[1] Based on total acid component=100.

The thermoplastic polyamides of this invention are somewhat acidic and have acid values of about 65 to 120. The acid value is defined as the number of milligrams of potassium hydroxide neutralized by the free acids present in one gram of polyamide.

The following examples illustrate specific procedures of conducting the reaction.

EXAMPLE I

Eighty grams of tall oil rosin acid and 20 grams of maleic anhydride were charged into a closed reaction vessel. The air in the reaction vessel was then replaced with nitrogen. The mixture was then carefully heated to a temperature of 200° C. with stirring. An exothermic reaction set in at a temperature of about 100° C. The mixture was held at a temperature of 200° C. for a period of one hour. This reaction produced 0.431 equivalent of a rosin acid-maleic anhydride adduct having an acid value of 242 and a ball and ring softening point of 129° C. Fifty four grams of polymeric fat acid (0.190 equivalent), 21.0 g. tall oil fatty acids (0.075 equivalent) and 8.0 grams adipic acid (0.11 equivalent) were charged into the reaction vessel with stirring. Stirring was necessary to avoid the formation of a solid resin at this point. The mixture was cooled to about 90° C. and 31.5 grams (0.433 equivalent) of bis(hexamethylene)triamine was added. An opaque foam-containing paste resulted. The mixture was then heated to a temperature of 140° C. and held for a period of 30 minutes. The temperature was then raised to 225° C. and held for 30 minutes. The reaction vessel was then evacuated to a pressure of about 10 mm. mercury for a period of 5 minutes. The mixture was cooled to a temperature of 200° C. The vacuum was broken with nitrogen and the product discharged from the reaction vessel. The product was an amber solid with acid value of 97 and a ball and ring softening point of 95° C. and had the following composition:

| | Equivalent percent |
|---|---|
| Rosin acid-maleic anhydride adduct | 53.6 |
| Polymeric fat acid | 23.5 |
| Monomeric fatty acid | 9.3 |
| Co-dicarboxylic acid | 13.6 |
| Bis(hexamethylene)triamine | 53.6 |

The resin prepared above was compared with commercially available resins used in water ink formulations for water resistance and speed of drying. The commercially available resins used for comparison were a bone dry shellac, a copolymer of styrene and acrylic acid sold under the trade name Joncryl® 67 by Johnson and Sons, Inc. and a rosin ester sold under the trade name Amberol® 750 by Rohm and Haas Co. Respectively, these resins have acid values of 88, 200 and 102–114.

Ink varnishes were made having the formulations shown in Table 1.

TABLE 1

| | Sample | | | |
|---|---|---|---|---|
| | A | B | C | D |
| | Grams | | | |
| Polyamide | 12.50 | | | |
| Dry bone shellac | | 12.50 | | |
| Styrene-acrylic acid copolymer | | | 12.50 | |
| Rosin ester | | | | 12.50 |
| Borax | 2.50 | 2.50 | 2.50 | 2.50 |
| Sodium hydroxide | 0.25 | 0.25 | 0.25 | 0.25 |
| n-Propanol | 5.00 | 5.00 | 5.00 | 5.00 |
| Water | 29.75 | 29.75 | 29.75 | 29.75 |
| Total | 50.00 | 50.00 | 50.00 | 50.00 |

The ink varnishes were prepared in a high speed Waring Blendor. Agitation was carried on for seven minutes and a temperature of 54° C. was attained.

Inks containing the above varnishes were made having the formulations shown in Table 2.

TABLE 2

| | Sample | | | |
|---|---|---|---|---|
| | E | F | G | H |
| | Grams | | | |
| Varnish: | | | | |
| A (polyamide) | 31.0 | | | |
| B (Bone dry shellac) | | 31.0 | | |
| C (styrene-acrylic acid copolymer) | | | 31.0 | |
| D (rosin ester) | | | | 31.0 |
| Black pigment | 8.5 | 8.5 | 8.5 | 8.5 |
| Water | 10.5 | 10.5 | 10.5 | 10.5 |
| Total | 50.0 | 50.0 | 50.0 | 50.0 |

The inks were made by grinding the varnishes with black pigment and water. Grinding was accomplished using 100 grams of steel balls per 50 grams of ink and shaking for one half hour using a Red Devil Paint Shaker.

The inks made as described above were evaluated by applying split drawdowns on a #40 Kraft Paper and allowing the ink to dry for 4, 7, 10 and 15 second periods and then placing the samples under hot tap water. The results are shown in Table 3.

TABLE 3

| | Ink sample | | | |
|---|---|---|---|---|
| | E | F | G | H |
| | Water resistance [1] | | | |
| Drying time: | | | | |
| 4.0 seconds | 10 | 1 | 1 | 2 |
| 7.0 seconds | 10 | 3 | 2 | 3 |
| 10.0 seconds | 10 | 9 | 4 | 4 |
| 15.0 seconds | 10 | 10— | 7 | 7 |

[1] Grading 1 to 10—10, represents unaltered condition; 1, represents almost washed away.

The "instant" drying speed and water resistance contributed by the polyamide is readily apparent from the above data. Even after 15 seconds drying time bone dry shellac, the styrene-acrylic acid copolymer and the rosin ester varnishes did not attain the water resistance level attained by the polyamide varnish in 4.0 seconds drying time.

Similar results can be obtained from polyamides shown in Examples II–VII.

EXAMPLES II–VII

Using the preparation procedure set out in Example I, polyamides were made having the formulation set out in Table 4.

TABLE 4

| Example | Rosin acid maleic anhydride adduct | Polymeric fat acid | Monomeric tall oil fatty acids | Dicarboxylic acid | | Alkylene polyamine | | Acid value | Ball and ring softening point, °C. |
|---|---|---|---|---|---|---|---|---|---|
| II | 61.0 | 29.7 | | Azelaic | 9.3 | Ethylene diamine | 50.0 | 79 | 110 |
| III | 67.2 | 24.8 | | Adipic | 8.0 | Hexamethylene diamine | 67.5 | 73 | 128 |
| IV | 67.2 | 24.8 | | do | 8.0 | 1,3-propane diamine | 67.5 | 83 | 128 |
| V | 68.7 | 17.4 | 8.2 | do | 5.7 | Bis(hexamethylene) triamine | 56.0 | 65 | 128 |
| VI | 75.0 | 19 | | do | 6.0 | Ethylene diamine | 67.2 | 86 | 148 |
| VII | 57.5 | 17 | | do | 25.5 | Bis(hexamethylene)triamine | 52.0 | 119 | 108 |

The embodiments of the invention in which an exclusive property or privilege is claimed are defined as follows:

1. A polyamide resin having an acid number of 65 to 120 consisting essentially of the amidification product of:

Total acid component: Equivalent percent
  (a) Rosin acid-dicarboxylic compound adduct _____ 50–75
  (b) Polymeric fat acid _____ 17–35
  (c) Monomeric fatty acid _____ 0–10
  (d) Dicarboxylic acid _____ 0–25
Total amine component:
  Alkylene polyamine _____ [1] 45–70

[1] Based upon total acid component=100.

wherein the rosin acid-dicarboxylic compound adduct is selected from the group consisting of rosin acid-maleic acid adduct, rosin acid-maleic anhydride adduct, rosin acid-fumaric acid adduct and mixtures thereof and said adduct consists essentially of about 100 to 200 equivalent percent of dicarboxylic compound to 100 equivalent percent of rosin acid, wherein the alkylene polyamine has the formula $$H_2N[(CH_2)_xNH]_y(CH_2)_xNH_2$$

wherein $x$ is an integer of 2 through 6 and $y$ is an integer of 0 through 4, wherein the dicarboxylic acid is selected from acids having the formulae $$\begin{array}{cc} \overset{O}{\underset{\|}{C}}-OH & \overset{O}{\underset{\|}{C}}-OH \\ | & | \\ \overset{C}{\underset{\|}{C}}-OH & R \\ O & | \\ & \overset{C}{\underset{\|}{C}}-OH \\ & O \end{array} \quad \text{or}$$

wherein R is an alkylene radical having 1 to 8 carbon atoms and the monomeric fatty acid contains 16 to 18 carbon atoms.

2. The polyamide resin of claim 1 wherein the monomeric fatty acids are tall oil fatty acids.

3. The polyamide resin of claim 1 wherein the amine component is bis(hexamethylene)triamine.

4. The polyamide resin of claim 1 wherein the rosin acid is a tall oil rosin acid.

References Cited

UNITED STATES PATENTS

| 3,554,982 | 1/1971 | Aldrich | 260—78 |
| 3,637,638 | 1/1972 | Sloan | 260—102 |
| 3,639,313 | 2/1972 | Gruben et al. | 260—24 |
| 3,652,469 | 3/1972 | Glaser et al. | 260—404.5 |
| 3,597,376 | 8/1971 | Tashiro | 260—18 |
| 3,253,940 | 5/1966 | Floyd et al. | 260—18 |
| 3,615,752 | 10/1971 | Hoffman, Jr. | 260—24 |

FOREIGN PATENTS

| 1,000,216 | 8/1965 | Great Britain | 260—18 |

DONALD E. CZAJA, Primary Examiner

E. C. RZUCIDLO, Assistant Examiner

U.S. Cl. X.R.

106—27, 30; 260—24, 102